United States Patent [19]
Orman et al.

[11] Patent Number: 5,424,045
[45] Date of Patent: Jun. 13, 1995

[54] COMBUSTION AND CATALYTIC REMEDIATION OF HYDROCARBON CONTAMINATED SOIL

[75] Inventors: Michael I. Orman, Carpinteria; Michael J. Joy, Newbury Park, both of Calif.

[73] Assignee: Newlandex Corporation, Ventura, Calif.

[21] Appl. No.: 153,348

[22] Filed: Nov. 16, 1993

[51] Int. Cl.[6] ............................................. B01J 8/02
[52] U.S. Cl. ................................. 422/189; 422/171; 422/173; 422/177; 422/180; 422/182; 423/245.3; 423/213.5; 431/5; 588/213
[58] Field of Search ............... 422/171, 180, 182, 173, 422/177, 129, 115, 189, 183; 60/277, 274, 317, 299; 423/245.3, 213.5; 431/5; 123/1 A; 588/213

[56] References Cited
U.S. PATENT DOCUMENTS

| | | | |
|---|---|---|---|
| 3,699,683 | 10/1972 | Tourtellotte et al. | 60/274 |
| 4,343,769 | 8/1982 | Henkelmann | 422/115 |
| 4,678,770 | 7/1987 | Wan et al. | 423/213.5 |
| 4,770,857 | 9/1988 | Ludwig | 422/155 |
| 4,782,625 | 11/1988 | Gerken et al. | 588/213 |
| 4,979,886 | 12/1990 | Rippberger | 422/129 |

*Primary Examiner*—Robert J. Warden
*Assistant Examiner*—Hien Tran
*Attorney, Agent, or Firm*—Marvin E. Jacobs

[57] ABSTRACT

Combustible hydrocarbon gas from a contaminated zone of soil and/or water is abated by removing hydrocarbon gas from the zone, combusting a first portion of the hydrocarbon gas in an internal combustion engine to develop power and to produce hot exhaust gas, delivering a second portion of the hydrocarbon gas and the hot exhaust gas to a catalytic unit, passing the hot gas exiting the catalytic unit in countercurrent heat exchange relation to the second portion of the hydrocarbon gas before venting said exit gas and utilizing the power from said engine to remove hydrocarbon gas and contaminated water from the zone and to pump the gases throughout the system.

13 Claims, 3 Drawing Sheets

COMBUSTION AND CATALYTIC REMEDIATION OF HYDROCARBON CONTAMINATED SOIL

TECHNICAL FIELD

This invention relates to remediation of combustible hydrocarbon contaminated soil and/or ground water and, more particularly, this invention relates to the combined use of internal combustion engine and catalytic oxidation to remediate vapors from the subsurface zone at all conditions of flow and concentration.

BACKGROUND OF THE INVENTION

A large part of the contamination of soil in this country is due to leakage of tanks or dumping of volatile liquid hydrocarbons onto the ground. The liquid hydrocarbons percolate into the soil to form an irregular plume and sometimes migrate to and mix with potable water. It is estimated that over $\frac{1}{3}$ of the more than 1 million motor fuel tanks in this country are leaking and over $\frac{1}{2}$ of the leaking tanks, leak at a rate in excess of 6 gallons per day. Over 1 million gallons of fuel are lost into the ground each day.

Soil excavation has been the traditional method for decontaminating a site with absorbed hydrocarbon contamination. It is often difficult to assess the full extent of the contamination. Besides being costly, excavating the soil merely changes the location of the contaminated soil. The number of sites for storing hazardous waste is decreasing. The expense and the regulations concerned with transporting the hazardous waste from the contaminated sites to the storage sites makes this an unattractive method of disposal. Current laws make the owner of the waste responsible forever for the stored waste whether it is the contaminated dirt or the spent carbon absorbent.

Soil ventilation is a cost effective way to decontaminate soil. This is effective in locations where the contamination has not reached groundwater. Currently there are two general methods used for remediation of groundwater before it can be discharged into a reinfiltration gallery, sewer or storm drain. These are carbon filtration or air stripping. Carbon filtration is not desirable on highly contaminated sites as the cost of carbon and its associated handling and disposal costs become prohibitive. With air stripping, the cost of carbon is eliminated leaving only replacement costs of packing as the major maintenance expense. However, in areas where emissions are controlled, carbon canisters for air polishing are required. When the soil is highly contaminated with hydrocarbon, the associated costs of carbon and the storage of the contaminated spent carbon again become prohibitive.

One proposal for the elimination of gasoline vapors is to burn the recovered vapors. The level of hydrocarbons recovered in the vapor stream is usually not sufficient to maintain combustion by these vapors alone. Either additional fuel must be added to the vapor to sustain combustion or catalyst must be used to maintain combustion.

A more effective manner of removal of vaporizable hydrocarbon liquid from a subsurface zone is to remove the liquid from the zone by vacuum extraction and combust the liquid hydrocarbon in an internal combustion engine which develops power to power the water lift and extraction pumps and any other energy or heat required to operate the system. If the hydrocarbon liquid is mixed with water the hydrocarbon liquid can be first separated in a spray aeration vacuum unit at high temperature as disclosed in U.S. Pat. No. 4,979,886 entitled Remediation of Combustible Organic Contaminated Water, the disclosure of which is incorporated herein by reference.

The system can be mounted on a skid, tractor or truck bed so that it is fully portable and self-contained. The system can be placed on-site and operated until all contaminates are removed from the soil. When no more vapor is extracted, the engine stops and the site is remediated.

The internal combustion engine on the transportable units have a limited capacity, typically about 80 cubic feet per minute (CFM). However, the vacuum extraction pumps and spray aeration unit can pull much higher flow such as 200–300 CFM. Air quality regulations do not allow the excess volatile hydrocarbons to be vented to atmosphere.

The commonly used approaches for cleaning up the excess volatile hydrocarbons being brought to the surface by the vacuum pump of the spray aeration unit are thermal and catalytic incineration, adsorption and absorption. Absorption and adsorption on carbon or molecular sieves are not cost effective and the sorption media are difficult to regenerate.

Catalysts allow the conversion of VOC's at significantly lower temperatures than thermal incineration and at a much lower operating cost. In addition to lower fuel costs, catalytic incineration units are usually smaller and the lower operating temperature often allows use of less expensive metals of construction, lower capital and maintenance costs and lower NOx production.

However, the catalyst must be operated within controlled temperature ranges. The catalyst inlet temperature is the controlling factor of conversion performance. The onset of conversion is known as the light-off temperature. Conversion rises rapidly with increasing temperatures until it reaches a constant level. This usually occurs at the point that the conversion is controlled by diffusion of the VOC's through the bulk gas film.

In order to be above the steep ascent region and to achieve maximum conversion efficiency, most beds are operated in the diffusion controlled region. However, the temperature in the diffusion controlled region is higher than the temperature of the vadose gas/air mixture feed steam. Also if the temperature of the catalyst bed is raised too quickly, the catalyst can sinter which shortens its life.

STATEMENT OF THE INVENTION

A soil remediation system is provided in accordance with the invention that can be operated to remove volatile hydrocarbons at all levels of flow and whether the hydrocarbons are free or are mixed with water. The system of the invention is portable and can be located on site until the remediation is complete. The system combusts all hydrocarbons present in the soil. The portion of the hydrocarbons combusted in an internal combustion engine (ICE) produces heat and energy which are utilized to operate the lift and vacuum pumps.

The system of the invention integrates an internal combustion engine and a unit for the catalytic oxidation of hydrocarbons to produce combustion gases that can be vented to the atmosphere. The catalyst is selected to be able to reduce the nitrogen oxides, oxidize the carbon monoxide from the engine to carbon dioxide and to convert the residual hydrocarbons from the engine and the hydrocarbons directly removed from the zone into water and carbon dioxide. However, the catalyst must be operated in a careful controlled range of temperature. If the temperature is too low the reaction with hydrocarbon gases is not efficient. If the temperature exceeds a certain maximum, the catalyst bed can sinter and is rendered ineffective. The heat in the exhaust gases from the engine is used to heat the catalyst bed to operating temperature. The heat in the output gas from the catalyst unit is used to preheat the incoming air and hydrocarbon mixture.

Another aspect of the invention resides in providing the catalyst unit and heat exchanger in a single unit which decreases capital cost, conserves space and reduces heat losses.

The system of the invention has several control features to ensure effective remediation of the vadose hydrocarbon gases. One control means senses the gas mixture fed to the catalyst unit. If the hydrocarbon concentration of the gas mixture is above 25% of the lower explosive limit (LEL) a signal is sent to kill the ignition of the engine so that pollutants are not exhausted to the atmosphere. Alternatively, the signal can be utilized to decrease the well flow to the unit. An internal sensor is positioned to sense the inlet temperature to the catalyst unit. If the temperature is too low, the outlet gas is recirculated through the heat exchanger and the catalytic unit until a minimum temperature is achieved.

As a further control to prevent the loss of catalyst activity, the outlet temperature from the catalytic conversion unit is sensed and when the temperature approaches the temperature at which the catalyst sinters, usually below about 1200° F., a signal is sent to kill the ignition of the internal combustion engine or to stop the flow of fuel or fuel/air mixture to the engine. Another option would be to increase the amount of dilution air to lower the reaction temperature. However, the cost of replacement of the catalyst and the down time should the catalyst element require replacement, favors killing of the engine and restarting the system when the temperature exceeds a set maximum.

The system of the invention is capable of abating at least 90%, preferably at least 99% of the hydrocarbons removed from soil and/or mixed with groundwater. The catalyst element is capable of abating the excess hydrocarbons bypassed from the engine to at least 90%, preferably by at least 99% while simultaneously converting carbon monoxide to carbon dioxide and while reducing nitrogen oxides to an acceptable level.

These and many other features and attendant advantages of the invention will become apparent as the invention becomes better understood by reference to the following detailed description when considered in conjunction with the accompanying drawings.

DETAILED DESCRIPTION OF THE INVENTION

Figure 1:
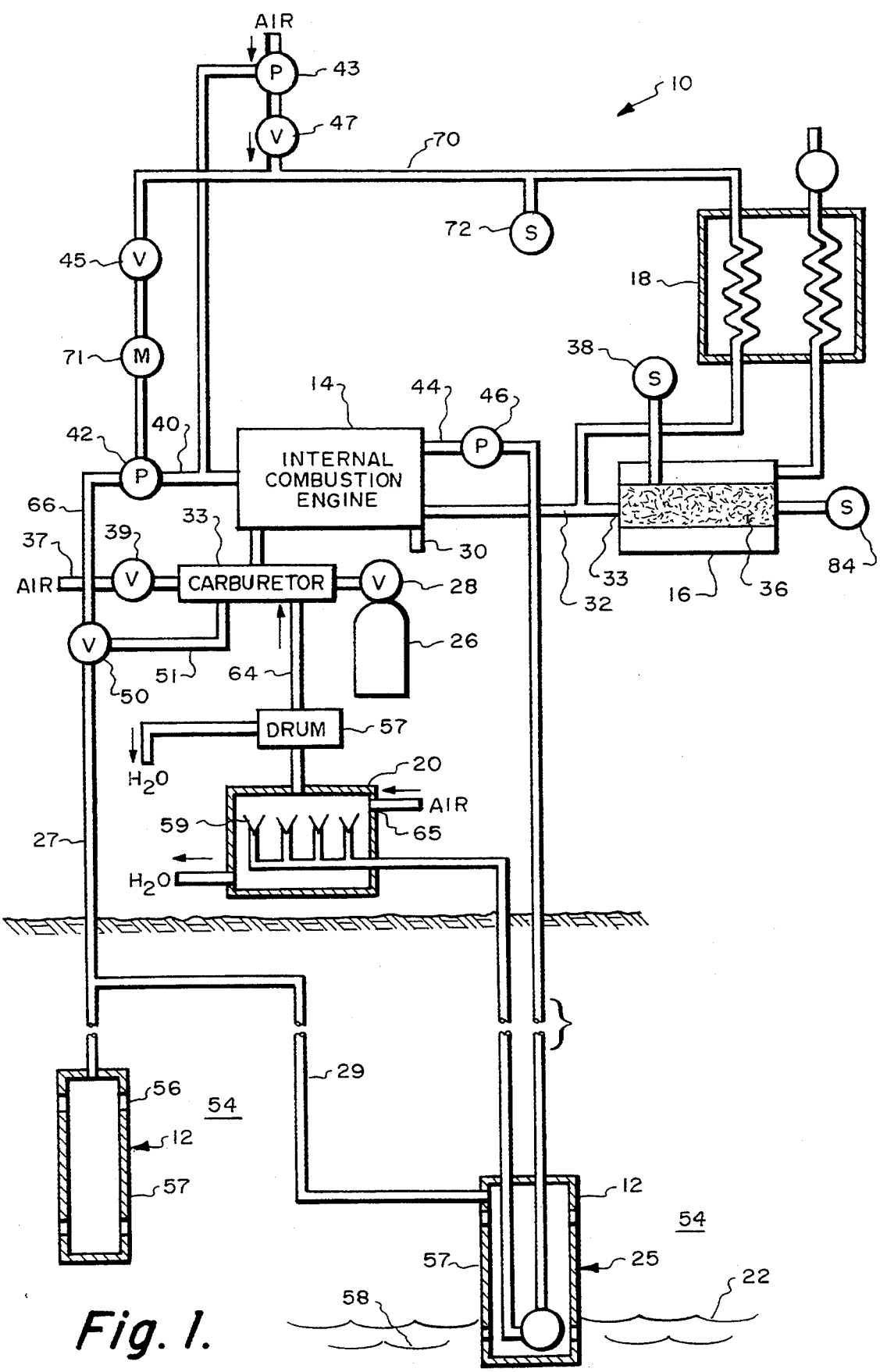
FIG. 1 is a schematic view of the integrated internal combustion engine-catalytic oxidation system according to the invention.

Referring now to FIG. 1, the remediation system 10 is comprised of a vadose well 12, an optional second well 25 extending into a contaminated body of water 22, an internal combustion engine 14, a catalyst conversion unit 16 and a heat exchanger 18. The system may optionally contain a hydrocarbon-water separation means 20 to separate liquid hydrocarbon from a contaminated body of water 22.

The engine can be operated by the vadose gases recovered from vadose well 12 through line 27 or from well 25 through line 29 or by auxiliary fuel, such as methane, ethane, propane or butane supplied by the storage tank 26.

The system 10 is operated by opening valve 28 on auxiliary fuel tank 26 and turning ignition 30. The engine 14 will operate and produce exhaust gas in exhaust line 32. Line 32 may contain a first automotive catalyst and a muffler, not shown. Valve 47 is opened to introduce dilution air into the catalyst unit. The exhaust gas at about 1000° F. enters the inlet 33 to the catalyst unit 16 and heats the catalyst element 36 to a temperature in the diffusion range of operating the catalyst as sensed by sensor 38. When the catalyst element 36 is at a temperature of at least 500° F., usually about 600° F., the valve 47 is closed and valve 45 is opened to feed the vadose gas-air mixture from well 12 into line 70.

The engine 14 develops power transmitted to a first power take-off 40. The power take-off 40 operates a vacuum pump 42. A second power take-off 41 drives an air compressor 46. Vacuum is delivered to the vadose well 12 through line 27 and to the well 25 through line 29. The vacuum draws vadose gas out of the formation 54 and into the well 12 through apertures 56 in the well casings 57. The compressor drives a down hole pump which drives contaminated water 58 from the body of water 22 into the spray heads 59 in a water-hydrocarbon separator 20. The separator may be a packed tower or a vacuum-spray unit as disclosed in U.S. Pat. No. 4,976,866, the disclosure of which is expressly incorporated herein by reference. In the separator 20 the hydrocarbon liquid is separated from the water and is vaporized or converted to form droplets which are mixed with air from inlet 65 of the separator 20. Any entrapped water in the output mixture in line 64 can be removed in a knockout drum 57. The output from the separator in line 64 can be sent to the carburetor 33 or by-passed to the inlet of the heat exchanger. The vadose gas in line 27 can all be fed to the heat exchanger 18 or a portion can be distributed by means of valve 50 and line 51 to the carburetor 33. Air is fed to the carburetor from the air-hydrocarbon mixture leaving the separator 20 or from line 37 containing valve 39. If the vadose gas flow in line 66 exceeds the capacity of the catalytic conversion unit 16, the flow is reduced by means of flow meter 71 or valve 45. Valve 50 can be manually operated to distribute the vadose gas-air mixture to the engine 14 through line 51 or to by-pass it to the heat exchanger through line which connects to line 70. Valve 50 can also be operated automatically to distribute a portion of the vadose gas-air mixture to the engine 14, the remainder to the heat exchanger 18.

The vadose gas-air mixture can be further diluted in line 70 with air supplied by air blower 43 driven by the power take off 40. The air blower could also be driven, not shown, by connection to the air compressor, not shown. The gas mixture in line 70 is slowly introduced into the heat exchanger 18 and the catalyst unit 16 to maintain the temperature of the catalyst in at least the diffusion range.

The system is then operated until all vadose vapors are removed and the contamination in the body of water 22 and the formation 54 is abated. The system will operate as long as the concentration of hydrocarbons in the catalyst unit is below the LEL and the temperature of the catalyst is maintained below sinter temperature. If the hydrocarbon concentration is above the LEL as sensed at sensor 72, a signal is sent to open the air dilution valve 47. The temperature of the outlet of the catalyst unit is sensed at sensor 84. If the temperature approaches the temperature at which the catalyst sinters, a signal is sent to kill the ignition 30 or a signal is sent to valve 43 to increase the fresh air flow and dilute the fuel-air mixture fed to the catalyst unit.

Figure 2:
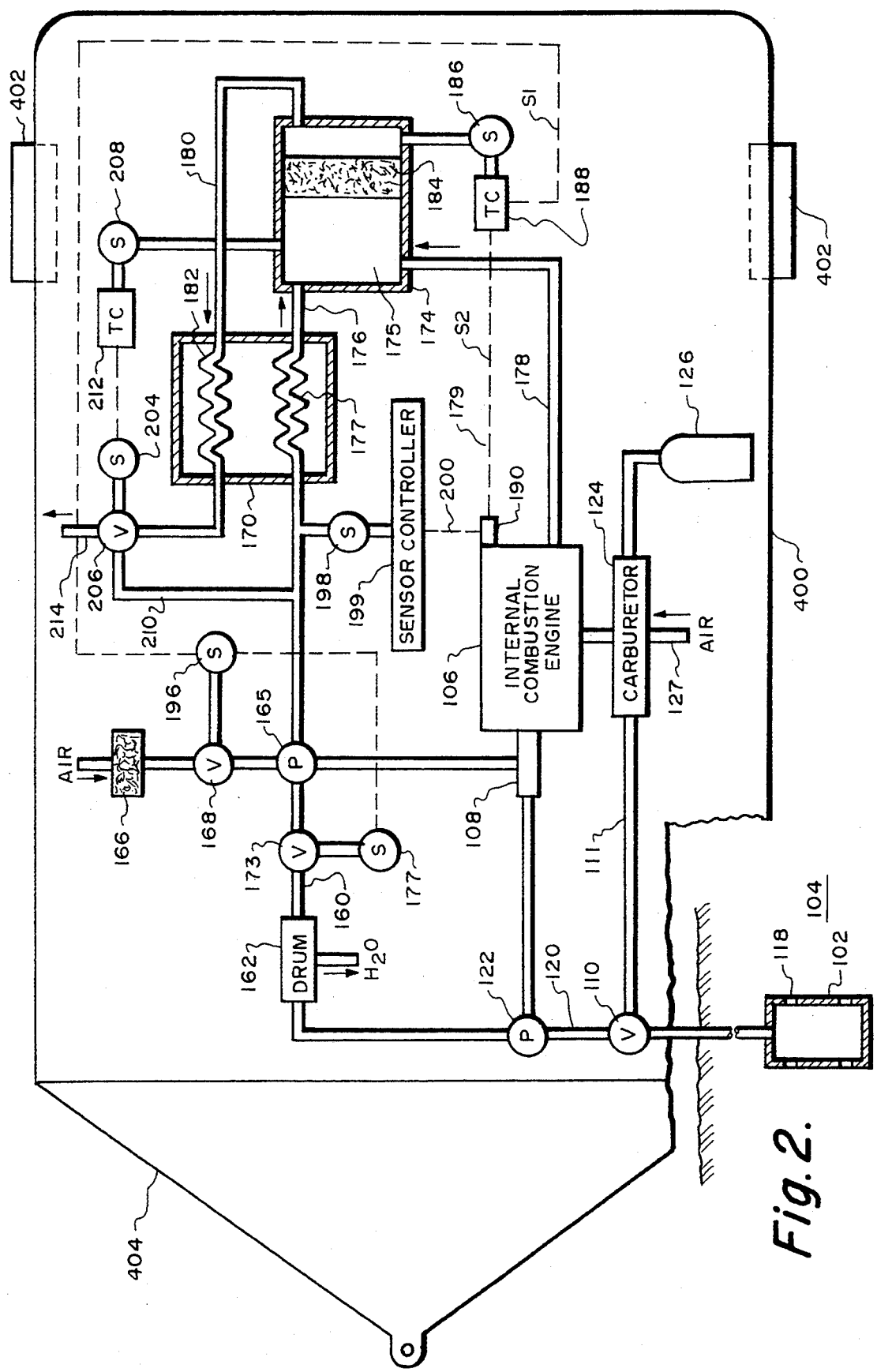
FIG. 2 is a schematic view of a system for remediating volatile combustible vadose hydrocarbons and/or vaporizable hydrocarbons mixed with water.

A more detailed system for recovering vadose vapors is illustrated in FIG. 2. A vadose well 102 is disposed in a zone 104 of contaminated soil. A power take off 108 from an IC engine 106 operates a vacuum pump 122 that removes vadose vapors mixed with air entering the well 102 though openings 118 and sends the mixture to line 120. Line 120 can contain a valve 110 that directs the flow of vadose gas to line 160 toward the heat exchanger 170 or into line 111 to the carburetor 124. The engine 106 is initially operated by fuel gas from auxiliary fuel tank 126 and air from air inlet 127. The vadose gas can be bled into line 111 to the carburetor as desired. The valve 110 can be a manually operated 2-way bypass valve or can contain a constant flow rate meter to restrict the vadose gas flow to the engine to the maximum amount that can be combusted.

Air blower pump 165 is also driven by the power take-off 108 from the engine 106. Liquid is removed from the vadose gas in knock out drum 162. Air is fed into line 160 by means of the air blower pump 165. The inlet to pump 165 contains an air filter 166 and valve 168.

The system is operated by starting the engine with auxiliary fuel from tank 126. Valves 168 and 173 are initially closed. The exhaust gas flows through to conventional automotive catalytic convertor. The exhaust gas exiting the catalytic converter is usually around 1000° F. The exhaust gas enters the mixing chamber 175 and heats the catalytic element 184. Valve 168 is then opened and dilution air is pumped into line 160 and through the heat exchanger 170 and catalytic unit 174. When the air is heated to a minimum temperature of 500° F., preferably 600° F., as sensed by temperature sensor 186, the controller 188 will send a first signal to solenoid 204 to close valve 206 and to solenoid 177 to open valve 173.

The vadose gas-air mixture from the well 102 will enter the catalyst unit and will be exothermically combusted by the porous catalyst element 184. The temperature will start to rise. The air-vadose gas mixture leaving pump 165 flows through the cold side 171 of the heat exchanger 170. The heated air-vadose gas mixture leaves the heat exchanger and enters the mixing chamber 175 of the catalyst conversion unit 174 through line 176. The exhaust line 178 from the engine is also fed into the mixing chamber 175. The hot conversion gases exit the catalytic unit 174 through line 180 and flow through the hot side 182 of the heat exchanger 170.

The catalyst element 184 can sinter at temperatures of about 1200° F. A first temperature sensor 186 is connected to a dual set temperature controller 188. As discussed, at a first temperature ($T_1$) of about 500°-600° F. the controller 188 sends a first signal ($S_1$) to the solenoid 196 to open valve 168 so that dilution air enters line 160. The same result could be obtained by by-passing the well flow or by using a variable speed blower pump 165 and using the $S_1$ signal to increase or decrease volume of air flow produced by the blower pump 165. At a second temperature of about 1000°-1100° F. a second signal ($S_2$) is sent through line 179 to solenoid 196 to open air dilution valve 168 until the low set point on the temperature controller 188 is reached. The dilution air valve 168 is shut off and solenoid 177 is activated to open valve 173 to reintroduce flow of vadose gas and air from the well 102. Above 1200° F., the system shuts down by killing the ignition 190 to the engine 106.

A LEL sensor 198 senses the hydrocarbon concentration in line 160. When the concentration is above the safe amount at which the catalyst unit operates, the LEL sensor controller 199 can also send a signal through line 200 to open dilution air valve 168. The inlet temperature in the mixing chamber 175 can also be sensed by a sensor 208. When the temperature is below the temperature at which complete combustion occurs, the valve 206 can be manually turned toward bypass line 210 or a signal can be sent to a controller 212 which operates solenoid 204 to turn valve 206 toward the bypass line 210. After the temperature reaches the minimum temperature, this valve 206 is turned toward vent 214.

Figure 3:
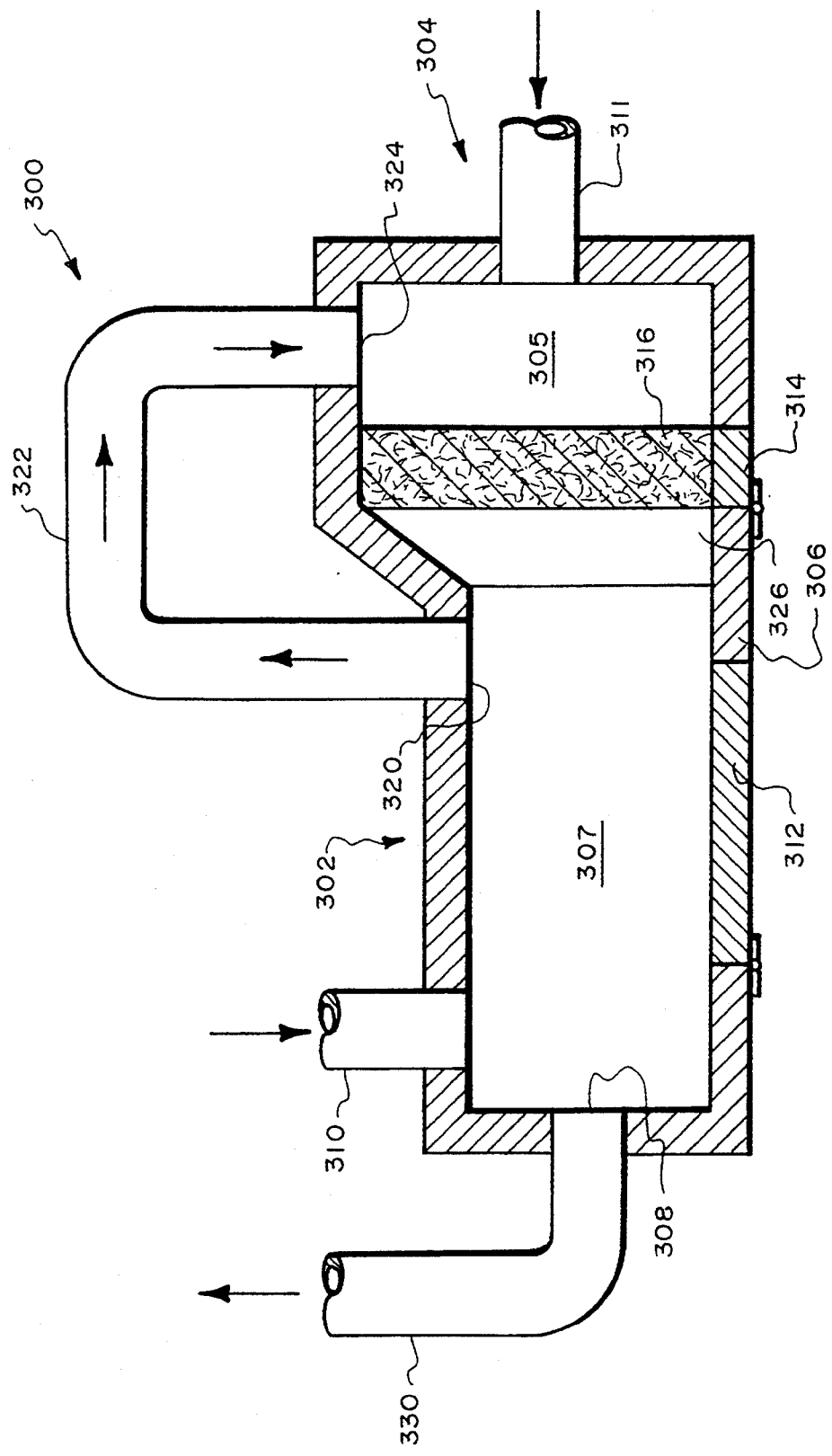
FIG. 3 is a partially in section view of a heat exchanger-catalyst unit.

The heat exchanger catalyst unit 300 shown in FIG. 3 includes a heat exchanger section 302 and a catalyst section 304 housed in a single, insulated enclosure 306. The heat exchanger section 302 preferably contains a static, plate-type heat exchanger 307 having two paths which separate the hot gas stream exiting the catalyst section 304 from the combustible hydrocarbon gas-air stream entering the heat exchanger section 302 through inlet 310. The heat exchanger section 302 has an access door 312 for cleaning or replacing the heat exchanger 307. The catalyst chamber 304 also has an access door 314 for access to the catalyst element 316.

The cool combustible hydrocarbon air stream preferably flows in countercurrent direction to the hot combustion gas. The cool combustible, hydrocarbon gas flows through one path in the plates of the heat exchanger 307 and leaves the section 302 through outlet port 320 and flows through insulated conduit 322 into the catalyst mixing chamber 305 through inlet 324. Exhaust gas from the engine enters the mixing chamber 305 through an inlet 311. The combustible gases react on the surface of catalyst element 316 to form $CO_2$, $H_2O$ and $NO_x$ gases which collect in a header 326 and exit the heat exchanger 307 through outlet 308 and are vented on. As the hot combustion gases flow through the second path, then heat the cool hydrocarbon air gas stream through the walls of the plates before they leave the heat exchanger through stack 330. The exhaust gases from the engine are used to preheat the catalyst element 316 at start up.

The catalyst can be provided as particles or a single element. It is preferred to coat the catalyst onto the surface of a single solid refractory element since that provides less pressure drop and higher rate of flow.

A suitable catalyst element is formed by coating a layer of catalyst onto a porous refractory base such as a monolithic honeycomb structure formed of alumina, silica or mixtures thereof. The catalyst element contains a coating on the outside surface of the element and on the surfaces of the pores. The catalyst for use in the invention are known as 3-way volatile organic compound (VOC) catalysts. These catalysts oxidize hydrocarbons to water and carbon dioxide, oxidize carbon monoxide to carbon dioxide and reduce nitrogen oxides to nitrogen.

The catalyst layer can include platinum or palladium as active hydrocarbon and carbon oxidation catalysts rhodium or nickel to reduce nitrogen oxides. The catalysts can contain other metals such as nickel as a promoter of $No_x$, reactive cerium for oxygen storage and zirconia to stabilize the catalyst.

A system has been designed and manufactured which contains a 4 cylinder internal combustion engine with a capacity of 80 CFM and a heat exchanger and catalyst unit capable of abating vadose gases at a flow rate of 200 CFM. Initial tests indicate that the system can effectively abate a vadose gas flow rate of 280 CFM.

The system can readily be mounted on a portable platform 400 which can in turn be mounted on axles containing wheels 402 and a tow yoke 404 can be connected to the front of the platform 400.

It is to be realized that only preferred embodiments of the invention have been described and that numerous substitutions, modifications and alterations are permissible without departing from the spirit and scope of the invention as defined in the following claims.

We claim:

1. A system for remediating a subsurface zone of soil and/or water contaminated with volatile, organic, combustible hydrocarbons comprising in combination:

means for removing volatile, organic, combustible hydrocarbons from a zone of soil or water contaminated with volatile, organic combustible hydrocarbons;

means connected to said removing means for mixing said removed volatile, organic, combustible hydrocarbons with air to form a combustible mixture;

a combustion engine having an ignition, a combustible mixture inlet and an exhaust outlet;

a catalytic unit connected to the exhaust outlet of the engine for oxidation of said volatile, organic, combustible hydrocarbons to produce a product gas, said catalytic unit having an inlet and a gas outlet;

distribution means receiving said combustible mixture from the mixing means and for dividing said combustible mixture into a first portion and a second portion;

a heat exchanger having a first circuit connected to the outlet of the catalytic unit and a second circuit in heat exchange relation to the first circuit for receiving a flow of said second portion of the combustible mixture to form a preheated combustible mixture:

a first conduit connected between the distribution means and the inlet of the engine for conveying the first portion of the combustible mixture to the engine, and a second conduit connected between the distribution means and the second circuit of the heat exchanger;

means connecting the heat exchanger to the inlet of the catalytic unit for conveying the preheated, combustible mixture to said catalytic unit;

power means connected to the engine for transferring power to said removing means; and wherein the catalytic unit includes a body of catalyst having a maximum lower explosive limit and wherein the system further includes a hydrocarbon sensor means disposed at the second conduit to sense the amount of hydrocarbon in the second portion of the combustible mixture and to develop a signal, a first controller electrically connected to said hydrocarbon sensor and the engine for receiving said signal and for interrupting the ignition of said engine when said signal indicates the hydrocarbon content of the second portion of said mixture entering the catalytic unit is above said maximum lower explosive limit.

2. A system according to claim 1 in which the removing means includes a vacuum pump.

3. A system according to claim 2 in which the vacuum pump is a pneumatically driven pump and the power means is a power take off connected to said engine.

4. A system according to claim 1 in which the body of catalyst in the catalytic unit has a temperature at which the body of the catalyst sinters and further including a temperature sensor connected to said body of the catalyst for sensing the temperature of the catalyst and for developing a second signal, an air inlet connected to the second conduit for adding air to the second portion of said combustible mixture, second controller means electrically connected to said temperature sensor, the air inlet and the engine for receiving said second signal and for increasing the amount of air in the second portion of the mixture and for interrupting ignition of said engine when the temperature of the catalyst approaches the sintering temperature.

5. A system according to claim 1 in which the removing means includes a water-hydrocarbon separation means.

6. A system according to claim 5 in which the separation means comprises a vacuum, spray-aeration tower.

7. A system according to claim 1 mounted on a portable platform.

8. A system according to claim 7 in which the platform includes a chassis, a plurality of wheels and a yoke for towing.

9. A system according to claim 1 in wherein the body of catalyst is porous.

10. A system according to claim 9 in which the body of catalyst is in the form of pellets.

11. A system according to claim 9 in which the body of catalyst is a porous, monolithic, refractory element.

12. A system according to claim 11 in which the element is a alumina-silica honeycomb containing a coating of a three-way volatile organic compound combustion catalyst.

13. A system according to claim 12 in which the catalyst contains a metal selected from the group consisting of platinum, palladium and mixtures thereof.

* * * * *